M. H. SMITH.
BATTERY ADAPTER.
APPLICATION FILED APR. 12, 1918.

1,304,214.

Patented May 20, 1919.

WITNESSES
Edw. Thorpe
Geo. J. Hoover

INVENTOR
Maxwell H. Smith
BY
ATTORNEYS

UNITED STATES PATENT OFFICE.

MAXWELL H. SMITH, OF PHILADELPHIA, PENNSYLVANIA.

BATTERY-ADAPTER.

1,304,214.  Specification of Letters Patent.  Patented May 20, 1919.

Application filed April 13, 1918. Serial No. 228,468.

*To all whom it may concern:*

Be it known that I, MAXWELL H. SMITH, a citizen of the United States, and a resident of Philadelphia, in the county of Philadelphia and State of Pennsylvania, have invented a new and Improved Battery-Adapter, of which the following is a full, clear, and exact description.

The object of the invention is to provide a new and improved battery adapter for use in flash lights and other similar electrical apparatus, and arranged to accommodate, at least, two battery cells each adapted to be removed when played out to permit of substituting a new one. Another object is to provide automatically an electric connection between the battery cells and to insure a proper electrical connection between the adapter and the electric lamp and switch. Another object is to provide an adapter which is exceedingly simple and durable in construction and can be readily placed in position in the casing of a flash light or other similar apparatus.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1:
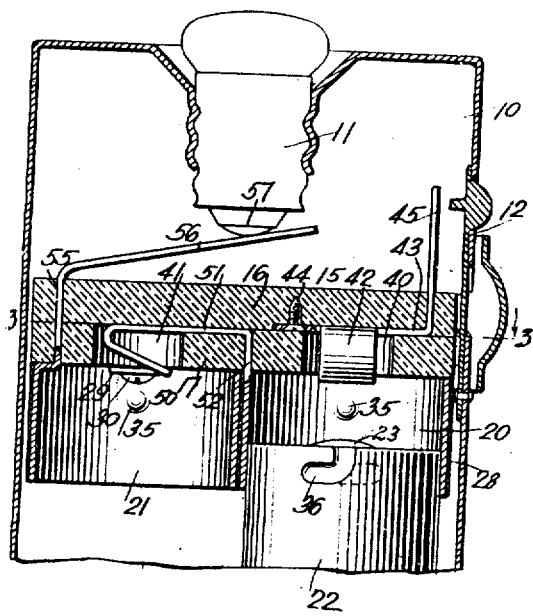
Figure 1 is a sectional side elevation of the adapter arranged for two battery cells and in position in the casing of a flash light with one of the battery cells removed and the other in partly withdrawn position.
Figure 3:
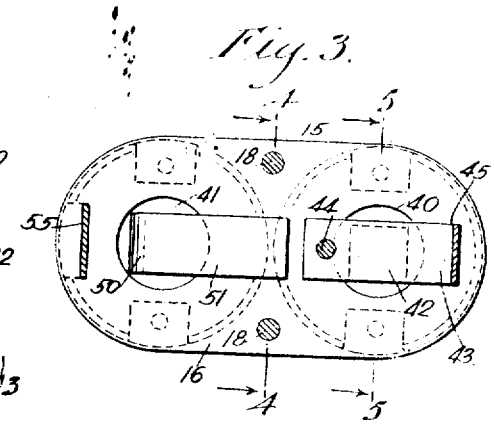
Fig. 3 is a sectional plan view of the adapter on the line 3—3 of Fig. 1.
Figure 4:
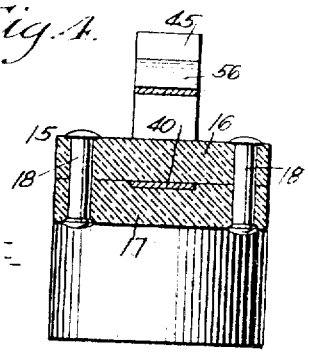
Fig. 4 is a cross section of the same on the line 4—4 of Fig. 3.
Figure 2:
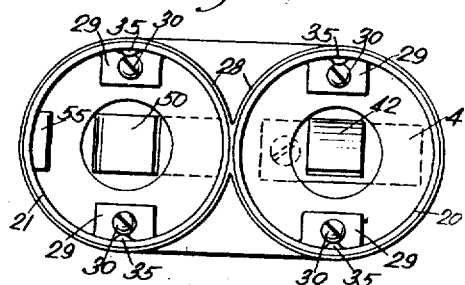
Fig. 2 is an inverted plan view of the adapter.
Figure 5:
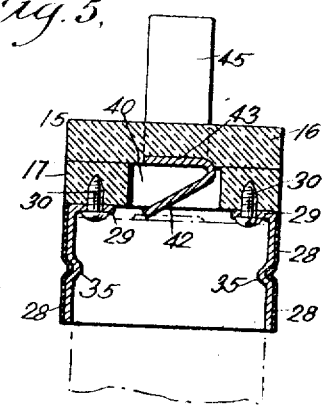
Fig. 5 is a similar view of the same on the line 5—5 of Fig. 3.
Figure 6:
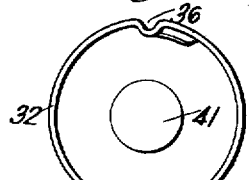
Fig. 6 is a plan view of one of the battery cells.
Figure 7:
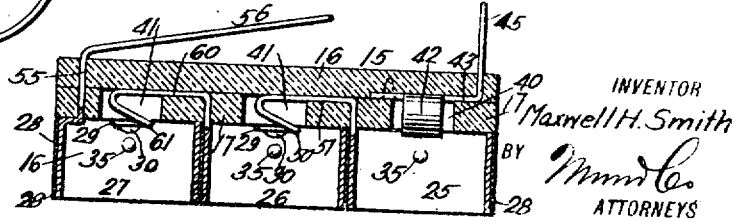
Fig. 7 is a sectional side elevation of a battery adapter arranged to accommodate three battery cells.

The electrical apparatus on which the adapter is used is shown in Fig. 1 as a flash light having the usual casing 10, an electric lamp 11 and a manually controlled switch 12. The adapter consists essentially of a support 15 of hard rubber, porcelain or other suitable insulating material and preferably made of two parts 16 and 17 fastened together by rivets, bolts or other fastening means 18, as plainly shown in Fig. 4. On the under side of the part 17 are secured two tubular holders 20 and 21 removably accommodating two battery cells 22 of usual construction having zinc or other metallic casings. As shown in Fig. 7, the part 17 of the support 15 is provided with three such tubular holders 25, 26 and 27 for accommodating three battery cells 22, but it is evident that I do not limit myself to the number of holders and battery cells on a single support as more than three may be used if desired. Each of the holders 20, 21, 25, 26 and 27 is made of metal and surrounded by suitable insulation 28, and each holder is provided with inwardly struck-up lugs 29 secured by screws or other fastening means 30 to the under side of the part 17 of the support 15 to securely hold the corresponding holder in position on the support.

Each of the cells 22 is removably held in the corresponding holder 20, 21, 25, 26 or 27 to permit of removing any one of the cells when worn out without disturbing the other cells. For the purpose mentioned the inner side of each holder 20, 21, 25, 26 or 27 is provided with a pair of oppositely disposed struck-up lugs 35 engaged by bayonet slots or grooves 36 formed exteriorly at one end of the metallic casing of the corresponding battery cell 22.

The part 17 of the support 15 is provided with apertures 40 and 41 centrally in register with the corresponding holders 20 and 21, and in the opening 40 extends a spring contact 42 adapted to be engaged by the electrode 23 of a corresponding battery cell 22 engaging the holder 20. The spring contact 42 is formed of a spring arm 43 held between the plates 16 and 17 and fastened to the plate 16 by a screw 44 or other fastening device. The end 45 of the arm 43 extends beyond the part 16 of the support 15 and is adapted to be engaged by the switch 12 when the latter is pressed so as to close the circuit for the electric lamp 11, as hereinafter more fully explained. In the opening 41 extends a spring contact 50 formed on one end of a plate 51 extending between the parts 16 and 17 of the support 15. The end 52 of the arm 51 connects or forms part of the holder 20 so that when a battery cell 22 is engaged with the holder 21 and the electrode 23 of the said cell engages the contact 50 then the two battery cells in the holders 20 and 21 are electrically connected with each other. The holder 21 is provided with an arm 55 extending through the parts 16 and 17 of the support 15, and the arm 55 has its end 58 arranged to engage the center contact 57 of the electric lamp 11 held in the casing 10 and having its other electrode connected with the casing so that if the switch 12 is pushed inward into engagement with the end 45 of the arm 43 then the circuit is closed and the lamp 11 is lighted.

In the modified form shown in Fig. 7, the electrical connection between the holders 25 and 26 is the same as above described, and the holder 26 is connected with an arm 60 held between the parts 16 and 17 terminating in a contact 61 engaged by the electrode 23 of the battery cells 22 fitted into the holder 27. The battery cell engaging the holder 25 makes contact with the contact 42 of the arm 43 having its end 45 arranged for engagement with the switch 12, and the holder 27 is provided with the arm 55, the end 56 of which engages the electrode 57 of the electric lamp 11.

From the foregoing it will be seen that the battery cells 22 can be readily placed in position in the holders 20, 21, 25, 26 and 27 and any one of the said cells can be removed from its corresponding holder when it is worn out to permit of placing a new cell in position in the said holder. When the adapter and its cells are in position in the casing 10 then the end 56 of the contact arm 55 engages the electrode 57 of the lamp 11, and the end 45 of the contact arm 43 is opposite the switch 12 so that when the latter is pressed the circuit for the lamp 11 is closed and the latter is lighted.

It is understood that the bottom of the casing 10 is usually in the form of a cap or a hinged door engaging the lower ends of the battery cells 22 to hold the adapter in proper position to insure contact of the end 56 with the contact 57 and to hold the end 45 in proper relation to the switch 12. It is understood that the connecting arm 51 and the contact arms 43 and 55 are of spring metal to insure proper contact with the corresponding parts.

The adapter shown and described is very simple and durable in construction, and an electric connection is automatically made between the battery cells when inserted in the holders of the adapter and proper contact of the electric connection is made between the battery and the electric lamp and switch, as above set forth.

Having thus described my invention, I claim as new and desire to secure by Letters Patent:—

1. A battery adapter for flash lights and other electrical apparatus, comprising a support of insulating material, a plurality of metallic holders secured to the said support and held spaced one from the other, battery cells having metallic casings removably fitting the said holders, interlocking means locking the said battery cells to the holders, a connecting member extending from one holder and engaged by a battery cell in another holder to electrically connect the battery cells with each other, a contact arm mounted on the said support and adapted to be engaged by the battery cell in one holder, and a contact arm connected with another holder, the said contact arms being adapted to be engaged by the contacts of the electrical apparatus on which the adapter is used.

2. An adapter for flash or other electrical apparatus, comprising a support, a plurality of spaced tubular holders projecting from one face of the holder, a spring contact on the support and having an arm projecting beyond the support for engagement by the switch of the apparatus on which the adapter is used, a contact arm connected with a holder and projecting beyond the support to be engaged by the contact of the lamp of the apparatus, a contact spring connected with a holder and extending to an adjacent holder, and battery cells extending into the holders and having interlocking engagement therewith.

3. An adapter for flash lights or other electrical apparatus, comprising a support made of two parts of insulating material fastened together, one part having central openings, a plurality of spaced tubular metallic holders provided with lugs attached to the apertured part of the support, a switch contact arm held between the said parts of the support and having one end extending into the central support opening at one holder, the other end of the switch contact projecting beyond the support for engagement by a switch of the apparatus on which the adapter is used, a contact arm connected with a holder and projecting beyond the support and adapted to be engaged by the contact of the lamp of the apparatus, a connecting plate connected with a holder and extending into a central support opening at the adjacent holder, and battery cells one for each holder, each battery cell and its holder having an interlocking means in the form of a stud and bayonet groove to removably fasten a cell in its holder.

MAXWELL H. SMITH.